United States Patent [19]

Lewis et al.

[11] 4,165,840

[45] Aug. 28, 1979

[54] METHOD FOR BRIGHTENING NATURAL CALCITIC ORES

[75] Inventors: Herbert I. Lewis, Wrens, Ga.; William M. Price, St. Austell, England; Anthony D. McConnell, Sandersville, Ga.

[73] Assignee: Anglo-American Clays Corporation, Sandersville, Ga.

[21] Appl. No.: 868,392

[22] Filed: Jan. 10, 1978

[51] Int. Cl.² ............................................. B02C 23/18
[52] U.S. Cl. ........................................ 241/20; 241/29
[58] Field of Search ....................... 241/16, 20, 24, 29

[56] References Cited

U.S. PATENT DOCUMENTS

| | | | |
|---|---|---|---|
| 3,307,790 | 3/1967 | Cohn et al. | 241/20 X |
| 3,512,722 | 5/1970 | Hall | 241/24 |
| 3,604,634 | 9/1971 | Windle | 241/16 |
| 3,980,240 | 9/1976 | Nott | 241/20 |
| 3,989,195 | 11/1976 | Steward | 241/16 |

*Primary Examiner*—Howard N. Goldberg
*Attorney, Agent, or Firm*—Weingram & Klauber

[57] ABSTRACT

A method is disclosed for processing a natural calcitic ore to yield a finely divided calcium carbonate particulate of very high brightness characteristics. The natural calcitic ore is initially coarse-milled to produce a product wherein no more than 5% by weight of the particulate is +325 mesh, and no more than 35% by weight of the particles are of less than 2 microns E.S.D. This coarse-milled product is then subjected as an aqueous slurry including less than 40% solids, to a froth flotation, which separates with the froth the relatively coarse colorbodies liberated in the initial grinding. The purified underflow is then dewatered to at least 60% solids by weight, and is wet-milled, as for example in a sand mill, to yield an output product wherein at least 80% by weight of the resultant particulate has an E.S.D. of less than 2 microns, the product being further characterized by a brightness of at least 94 on the G.E. scale.

5 Claims, No Drawings

METHOD FOR BRIGHTENING NATURAL CALCITIC ORES

BACKGROUND OF INVENTION

This invention relates generally to pigments and more specifically relates to a process for producing high brightness pigments by beneficiation of naturally occurring calcium carbonate.

Calcium carbonate pigments find application in a wide variety of industrial and other environments. Such pigments, for example, are widely utilized as fillers in the manufacture of papers, rubber and various plastics, and as extenders in paint formulations. Such pigments furthermore, either alone or in combination with other pigments, are widely utilized for paper coating applications. In many of the aforementioned applications, particularly e.g. where the pigments are used for coating, it is desirable that the calcium carbonate be as bright as possible.

High brightness calcium carbonate pigments have long been produced by chemical processes, pursuant to which the said carbonates are prepared as precipitates. These processes, however, are comparatively complex and are not well suited to large scale or low cost operations. Interest for such reason has long centered upon possible use of naturally occurring calcium carbonate, particularly in that natural calcitic minerals are extremely abundant in virtually all parts of the world, and therefore represent a ready source of inexpensive raw material. In practice, however, it is found that many of the natural calcitic deposits are so highly contaminated with discolorants, that when comminuted in their natural state they are simply inacceptable as pigments. Thus in typical instances deposits which are primarily of calcite may be contaminated with pyrites and with mica, both of which in varying degrees contribute to the discoloration of the otherwise relatively colorless calcium carbonate.

Various proposals have from time to time been advanced for processes directed at improving the brightness of the aforementioned naturally occurring calcium carbonates. Many of these prior proposals involve the use of flotation methods to remove impurities from calcitic ores. The bulk of such prior art, however, is centered upon the removal of siliceous impurities, so as to improve the remaining composition for use in cement manufacture.

In some instances too, flotation is recommended for improving the brightness characteristics of naturally occurring calcium carbonate. Thus, in U.S. Pat. No. 3,512,722, a wet-ground natural calcium carbonate is subjected to a flotation, after which the underflow is classified, partially dewatered, dried, and pulverized to reduce the agglomerates and larger particles.

Additional prior art pertinent to processes for brightening natural calcitic ores, is also cited in U.S. Pat. No. 3,980,240, which patent is assigned to the assignee of the present application. The method disclosed in that patent is thus concerned with brightening of a natural calcitic ore by crushing and forming same into an aqueous slurry, coarse-milling the slurry, fine milling the slurry to alter the particulates such that at least 70% of the particles are less than 2 microns, and then subjecting this fine-milled particulate to a separation by application of a high intensity magnetic field and/or by use of flotation.

Except for the aforementioned U.S. Pat. No. 3,980,240, the techniques of the prior art as discussed above, have in general been of limited efficacy in producing high brightness calcium carbonate pigments from natural sources. Indeed, in most instances where pigments are derived on a commercial scale from such natural sources, an ore is utilized which to begin with is of very high purity and relatively free from discoloring contaminants. Reference may be had in this connection, for example, to U.S. Pat. Nos. 3,661,610 and 3,674,529, which cite the use of calcium carbonate pigments derived from a raw, high purity natural chalk whiting. The natural whiting is subjected to a two-stage grinding process, it not being necessary in these instances to subject the product to purification, i.e. separation steps.

While the processes of the aforementioned U.S. Pat. No. 3,980,240 patent are in general most effective, it is yet found that certain disadvantages occur where one seeks to beneficiate the finely ground carbonate, i.e. the output from the second, fine grinding stage. Since, in particular, such beneficiation steps are normally carried out at relatively low solids (typically less than 50% by weight solids), problems can develop in the subsequent step of removing water from the slurry. In particular it is found to be quite difficult to dewater slurries of fine ground carbonates (e.g. where the particulate is such that 80% or more by weight of the particles are less than 2 micron) to achieve a solids content at which such slurry can be commercially shipped—i.e. preferably greater than 70% solids. Furthermore, as will be considered further hereinbelow, it is found that when grinding is carried out to a very fine degree, i.e. when the particulates are reduced to a very fine stage of comminution prior to separation, the colorbodies in consequence are so thoroughly and evenly distributed, throughout the material from which they are sought to be removed, that the efficacy of flotation is to a degree impeded, and the recovery of saleable product from the flotation step is much reduced.

In acccordance with the foregoing, it may be regarded as an object of the present invention, to provide a process which enables the production of high quality bright calcium carbonate pigments from naturally occurring calcitic ores containing relatively high levels of discoloring contaminants.

It is a further object of the present invention, to provide a process for purifying and brightening natural calcitic ores of relatively high discoloration, to yield a slurried pumpable product of high solids content, wherein the slurried carbonate includes at least 80% by weight of particles less than 2 microns E.S.D., and wherein the resultant product brightness is at least 94.

It is a still further object of the present invention, to provide a process meeting the foregoing objectives, which, further, enables beneficiation without adverse effects upon the subsequent dewatering operations which are deemed desirable to produce a product in a commercially advantageous form.

SUMMARY OF INVENTION

Now in accordance with the present invention, the foregoing objects, and others as will become apparent in the course of the ensuing specification, are achieved by a method pursuant to which the natural calcitic ore is initially coarse-milled to produce a product wherein no more than 5% by weight of the particulate is +325 mesh, and no more than 35% by weight of the particles are of less than 2 microns E.S.D. This coarse-milled product is then subjected as an aqueous slurry preferably including less than 40% solids, to a froth flotation, which separates with the froth the relatively coarse colorbodies liberated in the initial grinding. The purified underflow is then dewatered to at least 60% and preferably over 65% solids by weight, and is wet-milled, preferably in a sand mill, to yield an output product wherein at least 80% by weight of the resultant particulate has an E.S.D. of less than 2 microns, the product being further characterized by a brightness of at least 94 on the G.E. scale, and an abrasion less than 25 mg. as measured by the Valley Abrasion Test (carried out using Procedure 65 prescribed by the Institute of Paper Chemistry).

The product yielded by the invention is found to be especially well-suited to paper coating applications. In such environment the product has a significantly less detrimental effect on ink absorbency than does precipitated carbonates; and the product, further, has a less detrimental effect on gloss of coated papers than does conventional ground carbonates.

DESCRIPTION OF PREFERRED EMBODIMENT

In order to demonstrate the efficacy of the present inventive process a series of Examples illustrative thereof will now be set forth.

EXAMPLE I

In these Examples samples of various calcite deposits were utilized, which samples were of high calcium content, and included as impurities (among other elements) fine quartz, sand, mica and quantities of fine pyrites.

In the present Example, a natural calcite sample derived from Phillipsburg, Quebec, and of constitution in accordance with the preceding paragraph, was subjected to a preliminary crushing by a press, and thence was further crushed by use of a cone crusher. The sample was then wet ground by use of a ball mill at 65% solids to provide a particulate such that 28% by weight of the particles thereof were of less than 2 microns in size and no more than 2% by weight were larger than 325 mesh. Dispex N40 (trademark of Allied Colloids, Great Britain, for a sodium polyacrylate composition) was used during ball milling as a dispersant at a concentration of 9 lbs/ton solids—in order to facilitate grinding.

The brightness of the ore at this point was measured at 93.6 on the G.E. scale. In all instances in this specification it will be understood that brightness values are obtained according to the standard specification established by TAPPI procedure T-646m-54.

EXAMPLE II

The material from Example I, which at this point was in slurry form (65% solids) was diluted to 25% solids, and was subjected to a froth flotation using a combination of kerosene (0.15 lbs/ton) and a xanthate (Dow Z-3 at concentration of 0.1 lb/ton) as collectors. Pine Oil (0.1 lb/ton) and Aerofroth 77 (0.16 lb/ton) were used as frothers. (Aerofroth is a trademark of American Cyanamid for straight-chain higher alcohol compositions). The pH during the flotation treatment was approximately 9.5. The resultant purified product displayed a G.E. brightness of 94.5.

EXAMPLE III

The unbeneficiated material used as the input material for Example I was finely ground by wet-milling same at 70% solids in a sand mill utilizing Ottawa sand as a grinding media. An additional 9 lb/ton of Dispex was used to facilitate grinding. (Dispex at the indicated concentration was used in all ensuing Examples where sand grinding was effected.) The milling was continued to a point such that 96% by weight of the particles thereof had an E.S.D. less than 2 microns. The brightness of the material was evaluated and found to have dropped from the 93.6 noted in Example I to 93.2.

EXAMPLE IV

The floated carbonate material from Example II was flocced with 7 lbs/ton calcium carbonate and filtered to 70% solids then subjected to fine grinding by wet-milling the previously coarse-milled product with Ottawa sand—as in Example III. This fine grinding was effected at 70% solids, and for a time duration sufficient to reduce the particulate such that 95% of the particles had an equivalent spherical diameter (E.S.D) of less than 2 microns. The floated sand-ground product was then found to display a G.E. brightness of 95.8.

In comparing the brightness yielded in Example III with that yielded in Example IV, i.e. 93.2 vs. 95.8, it will be seen that a difference has resulted which is comparatively enormous. Of equal significance is the fact noted in Example III, that the brightness found therein, had actually dropped in consequence of the fine grinding operation. It is believed that this last result is explained by the hypothesis that the relatively coarse colorbodies liberated in the initial grinding stage have a limited effect upon brightness measurement when discretely distributed in the material. However, after further grinding to a very fine state of comminution, the colorbodies are more evenly distributed—with a resultant, disproportionate effect on brightness.

Using the process of Windle, U.S. Pat. No. 3,604,634 (Example III), the particle size is reduced to that of interest for the present invention; however, the brightness of the original material (Example I) is seen to drop from 93.6 to 93.2 as a result of fine grinding.

On the other hand, flotation of the Example I material, as in Example II, yields only a minor improvement in brightness (of 0.9 units). In the present invention however, quite unexpectedly, the specific combination and sequence of flotation and fine grinding utilized results in a product have the desired size characteristics (as in Windle), and with a brightness increase exceeding those yielded by the techniques of Examples II and III.

It will thus be evident that a synergistic phenomenom is occurring in the present invention. In particular, if we regard the brightness increase arising from fine grinding to be X units (where X may be positive or negative), that arising from flotation to be Y units, and the brightness increase yielded by the present invention to be Z units; then it is readily evident that Z is greater than the sum of X and Y.

The initial coarse grinding operation carried out in accordance with the present invention may be effected by various techniques known in the art as, for example, by means of a ball mill or by use of autogeneous grinding; or dry grinding. The fine grinding step is preferably effected (as in Example IV) by sand grinding, i.e. by grinding with a particulate grinding material consisting of particles which usually range in size from about 150 microns to ¼" in dia., and preferably from about 500 1 microns to about 2 mm. Details of the sand grinding operation, including citation of equivalent materials for use in sand grinding, are set forth in U.S. Pat. No. 3,604,634 to William Windle; and the conditions of grinding as set forth in that patent may be regarded as the preferable mode of operation with respect to the present invention. The fine-grinding step has its objective yielding an output product wherein at least 80% by weight of the resulting particulate has an E.S.D. of less than 2 microns, the product being further characterized by a brightness of at least 94 on the G.E. scale.

The froth flotation conducted pursuant to the invention is carried out with the slurry having a solids content of less than 40% and preferably less than 30%. Useful collector agents for the present process include Xanthates such as potassium ethyl Xanthate (Dow C-2), at typical concentrations of 0.1 lb/ton solid. Various hydrocarbons including kerosene, fuel oil, mineral oils, or mineral oil fractions, as well as aromatic hydrocarbons such as dipentine or other collectors as are known in the art, may also be utilized for these purposes. Similarly, frothers such as pine oil, cresylic acid, polypropylene glycol ether or other well known agents of this type may be utilized.

In the said dewatering operations—which are carried out upon the underflow following the froth flotation—the product is dewatered to at least 60% solids by weight, and preferably over 65% solids. Dewatering can be accomplished by conventional devices known in the art, including through use of rotary vacuum filters, or through the well-known Bird or similar centrifuges.

EXAMPLE V

In this Example, a sample of a coarse (+100 mesh) calcitic ore from a Maryland deposit was utilized. The sample was ball milled, using 9 lb/ton Dispex at 65% solids to give 2% greater than 325 mesh and 17% less than 2 microns E.S.D. (all by weight). At this stage, the brightness was 90.1. When the product was sand ground (with addition of 9 lbs/ton Dispex) the brightness dropped to 88.7.

When the coarse ground material was floated at 25% solids using 1 lb/ton Armeen C, the brightness increased to 94.4 ("Armeen C" is a trademark of Armak Co. for a monoamine). The floated product was then dewatered (flocced with 7 lbs/ton CaCl2 and filtered), and sand ground 70% solids with 9 lbs/ton Dispex). The brightness increased to 95.8.

In both of the above instances the sand ground product included by weight 90% less than 2 microns E.S.D. The brightness differential was 7.1 units.

EXAMPLE VI

In this Example a sample of a calcitic ore from a Maryland deposit was utilized, which was initially dry ground and classified to yield a product wherein 1% by weight of the particles were greater than 325 mesh and 15% by weight were less than 2 microns, with the sample having an initial brightness of 92.6. This sample was slurried to 67% solids and sand ground to 90% less than 2 microns using 9 lbs/ton Dispex. The brightness in consequence dropped to 90.5.

The same dry ground material was diluted to 25% solids and floated using 1 lb/ton of Armac C and 9 lbs/ton Dispex as flotation reagents (pH was 9). The floated brightness was found to be 93.6. ("Armac C" is a trademark of Armak Co. for acetic acid salts of the n-alkyl amines).

The floated product from the above procedure was dewatered using 7 lbs/ton CaCl2 and was sand ground to 90% less than 2 microns at 67% solids using 9 lbs/ton Dispex. The final brightness was 94.0. The brightness differential as between the floated and the unfloated sand ground products was 3.5 units.

EXAMPLE VII

A further sample of a calcitic ore from a Maryland deposit was dry ground and classified to yield an initial feed-stock wherein 2% by weight of the particles were greater than 325 mesh and 18% by weight were less than 2 microns. The brightness of this feedstock was initially determined to be 90.7. The sample was sand ground using 9 lbs/ton Dispex to 90% less than 2 microns, whereupon the brightness was found to have dropped to 90.3. It may be noted in connection with this Example and the preceding Example VI that certain advantages accrue by virtue of the dry grinding procedure which produces the inital feedstock. In particular no dispersants are used in these early grinding stages, which dispersants might otherwise might have to be counteracted by later use of flocculants.

When the feedstock used in this Example was diluted to 25% solids and floated using 12 lbs/ton Kerosene and 2 lbs/ton Duomac T (trademark Of Armak Co. for N-tallow trimethylene diamine diacetate) as collectors; and 0.2 lb/ton Igepal CO710—trademark of GAF Corporation for nonylphenoxypoly (ethyleneoxy) ethanol——and 0.1 lb/ton Triton CF10 (trademark of Rohm & Haas for alkyl laryl polyether) as frothers and at a pH of 8–9, the brightness had improved to 92.2.

In this Example the flotation product was dewatered in a Buchner filter without the use of CaCl2 as flocculant and was then sand ground (with 9 lb/ton Dispex) to 90% less than 2 microns. The final brightness was found to be 95.2.

From the foregoing it will be seen that the differential in brightness as between the floated and unfloated sand ground products was 4.9 units.

EXAMPLE VIII

The present Example was similar to Example VII above, except in this instance, the flotation, dewatering, and grinding steps were carried out in a large pilot plant scale. Thus, dewatering was carried out in a Bird centrifuge rather than in a lab filter. The feed material was of the general type described in connection with the two preceding Examples, and included 15% by weight of particles less than 2 microns. The flotation reagents utilized were as follows:

1.0 lb/ton—Duomac T
0.25 lb/ton—Igepal CO710
0.15 lb/ton—Triton CF10
12 lb/ton—Kerosene The brightness determined for the original feedstock was 90.4; the brightness of the sand ground product was 90.5; the brightness of the floated product was 93.5; and that of the floated, dewatered, and sand ground product was 96.2. In all instances, the treating sequences are as described in the preceding Examples. It will especially be noted that the brightness differential as between the floated and unfloated sand ground products was 5.7 units.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A method for processing a natural calcitic ore to yield a finely divided calcium carbonate particulate of relatively very high brightness characteristics, comprising in sequence the steps of:

coarse-milling said natural calcitic ores to produce a coarse-milled product;

subjecting said coarse-milled product as an aqueous slurry including less than 40% solids to a froth flotation, and separating with the froth discoloring contaminants;

dewatering the underflow product from said froth flotation to at least 60% solids by weight; and wet-milling the dewatered product to yield an output product wherein at least 80% by weight of the resultant particulate has an E.S.D. of less than 2 microns, said output product being further characterized by a brightness of at least 94 on the G.E. scale.

2. A method in accordance with claim 1, wherein said coarse-milling effects reduction of said natural calcitic ore such that no more than 5% by weight of the particles thereof are +325 mesh, and no more than 35% are of less than 2 microns E.S.D.

3. A method in accordance with claim 2, wherein said wet milling is effected by sand grinding.

4. A method in accordance with claim 2, wherein said froth flotation product is dewatered to over 65% solids.

5. A method in accordance with claim 1, wherein said coarse-milling is effected by dry grinding.

* * * * *